United States Patent [19]

Brixner

[11] Patent Number: 4,488,983

[45] Date of Patent: Dec. 18, 1984

[54] PREPARATION OF LANTHANUM BISMUTH OXYCHLORIDE PHOSPHORS

[75] Inventor: Lothar H. Brixner, West Chester, Pa.

[73] Assignee: E. I. Du Pont de Nemours and Company, Wilmington, Del.

[21] Appl. No.: 487,895

[22] Filed: Apr. 22, 1983

[51] Int. Cl.³ ............................................ C09K 11/475
[52] U.S. Cl. ....................... 252/301.4 H; 252/301.4 F
[58] Field of Search .................. 252/301.4 H, 301.4 F

[56] References Cited

U.S. PATENT DOCUMENTS

| | | | |
|---|---|---|---|
| Re. 28,592 | 10/1975 | Rabatin et al. | 252/301.4 H |
| 2,729,604 | 1/1956 | Swindels | 252/301.4 H |
| 4,068,129 | 1/1978 | Rabatin | 252/301.4 H X |
| 4,315,979 | 2/1982 | Brines et al. | 252/301.4 H X |

OTHER PUBLICATIONS

Simons, "J. Electrochemical Soc.", 118, p. 148, (1971).

Primary Examiner—Jack Cooper

[57] ABSTRACT

A process is provided for preparing lanthanum bismuth oxychloride phosphors of formula $La_{1-x-y}Bi_x RE_yOCl$, where RE is a rare earth element, x is 0.001 to about 0.25, and y is 0 to 0.005. The process is characterized by a single firing step, and comprises (a) forming an intimate mixture of stoichiometric quantities of $La_2O_3$, $Bi_2O_3$, and a rare earth oxide of formula $RE_2O_3$, together with $NH_4Cl$ and a flux comprising $BaCl_2$, where quantities of $NH_4Cl$ and $BaCl_2$, by weight, can be independently chosen from between about one-third to about one-half that of the combined weights of the oxides; (b) firing said mixture, in an inert container and in air, according to a time-temperature sequence in which the mixture is heated (1) from 1 to about 4 hours at about 275° C. to 325° C., followed by (2) from 2 to about 4 hours at about 275° C. to 500° C., and concluded by (3) from about 8 to 10 hours at about 800° C. to 1000° C.; and (c) recovering said phosphor from said mixture by washing the mixture with water.

4 Claims, No Drawings

PREPARATION OF LANTHANUM BISMUTH OXYCHLORIDE PHOSPHORS

BACKGROUND OF THE INVENTION

This invention relates to a process for preparing phosphors. More particularly, the invention pertains to a process for preparing lanthanum bismuth oxychloride phosphors, to improved phosphors prepared by this process and to improved X-ray intensifying screens incorporating these phosphors.

A number of prior workers have disclosed methods for preparing lanthanum oxyhalide compositions, some of which incorporate activators such as bismuth or certain rare earth elements.

Swindells, *J. Electrochemical Soc.* 101, p. 415 (1954), and U.S. Pat. No. 2,729,604, discloses a method for producing lanthanum oxychloride phosphors, incorporating activator elements such as bismuth, antimony, or rare earth elements. According to this process, $La_2O_3$ and activator oxide compounds are dissolved in aqueous HCl, and the resulting hydrated lanthanum chloride solution evaporated to dryness. The chloride is then baked by heating in air at 400° C., pulverized, fired at 600° C., pulverized, and finally fired at a temperature of 800° C. to 1000° C. for a selected period. Swindells discloses that the initial firing steps can optionally be omitted, and that the final product can be ground and screened prior to use.

Simons, *J. Electrochemical Soc.* 118, p. 148 (1971), discloses a similar process in which $La_2O_3$ and $Bi_2O_3$ are dissolved in aqueous HCl, evaporated to dryness, and the resulting chloride residue fired in air overnight at 600° C., followed by an additional air firing at 1000° C. for 3 hours.

Jacquier, *J. Luminescence* 10, pp 95–102 (1975), describes another method for producing lanthanum oxychloride phospors. According to this method, lanthanum chloride, produced by evaporation of a solution of lanthanum oxide in aqueous HCl, is mixed and pulverized with a quantity of calcium chloride equal to about five times the weight of lanthanum chloride to be converted to the oxychloride. The resulting mixture is melted in a platinum crucible, held for several hours at a temperature above the melting point of the mixture, cooled and dissolved in acetic acid. The residue resulting from this step is described as well-crystallized LaOCl.

A variant of the foregoing processes, adapted for producing a samarium-activated lanthanum oxychloride phosphor, is described in Swindells, U.S. Pat. No. 2,729,605. The process parameters disclosed are substantially similar to those disclosed in U.S. Pat. No. 2,729,604.

Rabatin, U.S. Pat. No. 3,591,516, discloses a "fused salt" process for preparation of yttrium and other rare-earth oxyhalides wherein mixtures of rare earth oxides, including activator rare earth oxides, are heated with ammonium halide for at least one hour at 400° C. to 500° C., and the resulting oxyhalide heated with an alkali halide flux for at least one hour at 800° C. to 1200° C. The alkali halide flux can be formed by adding alkali carbonate to the starting materials prior to the initial heating, or can be added between heating steps.

The aforementioned Rabatin patent describes a preferred method for producing the rare earth oxides employed as starting materials, in which the rare earth oxides are slurried in water, heated, and dissolved by adding $HNO_3$. This solution is cooled, and the rare earths are precipitated as the corresponding oxalates by addition of excess solid oxalic acid. The mixed oxalate precipitates are recovered by filtration, dried in air at 100° C., and fired in air at 1100° C. for approximately one hour to produce the mixed oxides. This reference discloses application of this method to the preparation of terbium-activated LaOCl. British Patent Specification No. 1,319,569 discloses an analogous process for production of LaOCl activated with terbium and ytterbium.

West German Patent Specification (Offenlegungsschrift) No. 2,506,382 discloses a fused salt process for preparing lanthanum bismuth oxychloride and other compounds of the formula $Ln_xBi_{x-1}OX$, where Ln is lanthanum or a rare earth element, especially La, Gd, or Y, x is from 0.95 to 0.9999, and X is Cl, Br, F or I. The process disclosed, like that of Rabatin, U.S. Pat. No. 3,591,516, incorporates a step in which the rare earth metal oxides, e.g. La, are precipitated as oxalates from dilute $HNO_3$, and subsequently converted to a mixture of oxides by firing at 700° C. to 1000° C. As in Rabatin, U.S. Pat. No. 3,591,516, the oxide mixture is heated with the appropriate ammonium halide to produce oxyhalide. The oxyhalide is then fired with an alkali halide flux, preferably potassium halide, at 950° C. to 1100° C. for 1 to 2.5 hours.

Rabatin, U.S. Pat. No. 3,607,770, discloses a "gaseous reaction" process for production of rare earth oxyhalide compositions. In this process, mixed oxides of selected rare earth elements are blended with $NH_4Cl$ and fired for at least one hour at a temperature of 400° C. to about 500° C. to convert the mixed oxides to the oxyhalide. At this point, the oxyhalide particles are recrystallized by firing for at least one hour at a temperature between about 800° C. and about 1200° C. in an atmosphere of hydrogen halide mixed with $N_2$, $CO_2$, or air. In a preferred process, the mixed oxides are prepared by oxalate precipitation as disclosed in Rabatin, U.S. Pat. No. 3,591,516. Optionally, $NH_4Cl$ may be omitted and the mixed oxides fired directly in the hydrogen halide atmosphere.

Rabatin, U.S. Pat. No. 3,617,743, discloses both gaseous reaction and fused salt processes for preparation of terbium-activated lanthanum oxyhalides of the formula LaOX: Tb, which parallel the processes disclosed in U.S. Pat. Nos. 3,607,770 and 3,591,516. The use of these compositions in X-ray image intensifying screens is also described.

Rabatin, U.S. Pat. No. Re 28,592, discloses a process for preparation of ytterbium-activated lanthanum oxychloride phosphors with reduced afterglow, or lag, according to the fused salt process of U.S. Pat. No. 3,591,516.

Rababin, U.S. Pat. No. 4,068,129, discloses a process for preparation of a preferred rare earth oxybromide phosphor $Ln_{1-x-y}OBr: Bi_xYb_y$, where Ln can be La or Gd, x is between 0.0005 and 0.15, and y is between 0 and 0.01. Chloride ion can be partially substituted for bromide ion. These phosphors can be produced by the fused salt process or the gaseous reaction process.

Brines and Rabatin, U.S. Pat. No. 4,315,979, disclose an improved rare earth oxyhalide LnOX:Tx, where Ln is La or Gd, X is Cl or Br, and $T_x$ is an activator chosen from Tb and Tm. In addition, a process, similar to the fused salt process, is described. In this process, mixed rare earth oxides are heated with the appropriate ammonium halide NH₄X to form oxyhalide, which is then recrystallized from an alkali halide mixture by heating to temperatures above the eutectic melting temperature of the mixture. This reference characterizes a preferred recrystallization mixture comprising $uAX+wMX_2+yRX_3+z$ ROX, where X is Cl or Br; A is one or more of Li, Na, K and Cs; M is one or more of Mg, Ca, Sr, Ba, Zn, Mn, and Cd; R is La or Gd; u is from a small but effective amount up to about 50 weight percent, w is from 0 to about 20 weight percent; y is from a small but effective amount up to about 50 weight percent; and z is at least 40 weight percent.

Research Disclosure 218:20621 (1981) details a method for recrystallization of rare earth oxyhalide phosphors, in particular, bismuth-activated lanthanum oxychloride phosphors. In this process, an activator/rare earth mixed oxide or oxide mixture is reacted with gaseous halogen, preferably at a temperature above 400° C., to produce activated rare earth oxyhalide in a form of fluffy white crystals. This product is then recrystallized in a substantially dehydrated magnesium halide flux. This disclosure further describes a single step process in which activator-rare earth mixed oxide or oxide mixture is blended with substantially dehydrated magnesium halide flux, packed into an inert crucible, and fired at a temperature of above about 700° C. to form oxyhalide phosphor, in situ, in a single step. The mixed oxides to be used are preferably prepared by oxalate precipitation methods.

Although numerous methods of producing rare-earth oxyhalide phosphors have been disclosed, an efficient process for producing high-quality lanthanum bismuth oxychloride phosphor is needed. For cost considerations, it is desirable to eliminate such process steps as coprecipitation of oxide precursors, firing in the presence of gaseous reactants, multiple firings, or various milling or grinding steps.

SUMMARY OF THE INVENTION

The present invention provides a single firing step process for production of lanthanum bismuth oxychloride phosphors of formula $La_{1-x-y}Bi_xRE_yOCl$, where RE is one or more of the elements having atomic number 58 through 71, x is 0.001 to about 0.25, and y is 0 to 0.005, comprising (a) contacting and forming an intimate mixture of stoichiometric quantities of $La_2O_3$, $Bi_2O_3$, and a rare earth oxide of the formula $Re_2O_3$, together with $NH_4Cl$ and a flux comprising $BaCl_2$, where the weight of $NH_4Cl$ and $BaCl_2$ can independently be chosen from about one-third to about one-half that of the combined weights of $LA_2O_3$, $Bi_2O_3$, and $RE_2O_3$; (b) firing said mixture according to a time/temperature sequence in which the mixture, in an inert container and in air, is heated
   (1) from 1 to about 4 hours at about 275° C. to 325° C.,
   (2) from 2 to about 4 hours at about 275° C. to 500° C., and
   (3) from about 8 to 10 hours at about 800° C. to 1000° C., and
(c) recovering said phosphor from said mixture by washing the mixture with water.

In addition, the present invention relates to improved X-ray intensifying phosphors prepared by the foregoing process, and to improved X-ray intensifying screens incorporating said phosphors.

DETAILED DESCRIPTION OF THE INVENTION

According to the present invention, lanthanum bismuth oxychloride phosphors exhibiting characteristics preferred for incorporation into X-ray intensifying screens can be prepared directly through a simplified process. In this process, stoichiometric amounts of lanthanum oxide, bismuth oxide, and selected rare earth oxides are mechanically mixed with ammonium chloride and a barium chloride flux, heated to cause dissociation and volatilization of the ammonium chloride, and fired in air at temperatures between about 800° C. and about 1000° C. The phosphor is recovered by filtration after washing the resulting mixture with water to dissolve the flux.

As used herein, "rare earth" refers to elements having atomic numbers 58–71, and excludes lanthanum. The stoichiometric amounts selected correspond to the formula $La_{1-x-y}Bi_xRE_yOCl$, where RE is a rare earth element, x is 0.001 to about 0.25, and y is 0 to 0.005. A preferred process of the present invention is that in which RE is Yb and x is from 0.005 to 0.015. Optionally, a finely-divided silica powder can be added to a final phosphor product at about 0.05 to 0.1 weight percent to impart superior flow characteristics.

The starting materials for the process of the invention are first intimately mixed by techniques well known in the art. For example, mixing can be effected by placing selected rare earth oxides, together with selected quantities of $NH_4Cl$ and $BaCl_2$, in a polyethylene container and shaking the container on a paint shaker for a period of between 15 and 45 minutes. The quantities of $NH_4Cl$ and $BaCl_2$, by weight, are selected from about one-third to about one-half the weight of the combined oxides. The resulting mixture is placed in an inert container or crucible, for example, a porcelain, alumina, or quartz crucible, for an initial heating step conducted for about 1 to 4 hours at from about 275° C. to 325° C. A second heating step is conducted for about 2 to 4 hours at about 275° C. to 500° C., and the process is concluded by firing at a temperature of from about 800° C. to 1000° C. for about 8 to 10 hours.

The sequential heating process disclosed herein is designed to permit $NH_4Cl$ present in the initial reaction mixture to slowly dissociate, evolving HCl, which reacts with the oxides to form lanthanum bismuth oxychloride. $NH_4Cl$ volatilizes with dissociation at about 340° C., so the first heating step must be carried out at a temperature below 340° C. to avoid rapid dissociation. The second heating step, at about 275° C. to 500° C., is provided to volatilize any remaining $NH_4Cl$ prior to the final firing step. Thus, the temperatures at which the first and second heating steps are conducted can vary within limits established by the requirements of this dissociation/volatilization sequence.

The entire heating process is carried out sequentially, in air, without interruption for pulverizing or grinding steps. A preferred temperature for the final heating phase is 950° C. After a period of cooling, the resulting sintered cake is removed from the container or crucible, and washed with water to dissolve the flux. After filtering and drying, the resulting phosphor product is typically passed through a No. 325 mesh sieve (U.S. series, 44 micron opening) and can immediately be incorporated into an X-ray intensifying screen. Optionally, between 0.05 and 0.1 weight percent of a very finely divided silica powder can be thoroughly mixed into the phosphor, in order to impart better flow characteristics.

Lanthanum bismuth oxychloride phosphor produced by the process of the invention exhibits a useful size distribution for incorporation into X-ray intensifying screens. The process of the invention does not require coprecipitation of oxide precursors, firing in a chlorine or hydrogen chloride atmosphere, multiple firings, recrystallization in an inert atmosphere, or subsequent milling of phosphor to achieve a useful particle size.

The phosphor product obtained by the process of this invention is a pure, single phase compound with a tetragonal PbFCl structure and $P4/nmm$ space group symmetry, with the following parameters:

$a = 4.1214(6)$ Å $(0.41214(6) nm)$ $c = 6.882(1)$ Å $(0.6882(1) nm)$ $V = 116.90(3)$ Å$^3$ $(0.1169(3) nm^3)$

Density, $\rho_{(X-ray)} = 5.426$ g/ml.

The numbers in parentheses, above, are deviations of the least significant figures. No significant variation in unit cell dimensions could be determined over the range of Bi concentrations relevant to the present invention.

The surface area of the phosphor made by the process of this invention is typically 0.2 to 0.4 m$^2$/g, which generally increases to 0.4 to 0.8 m$^2$/g upon mixing with the silica powder previously disclosed. Particle size, as determined by scanning electron microscopy, can range from about 5 to 20 microns depending upon firing temperature. Particle morphology resembles that of a nearly round flat plate, characteristic of PbFCl layer structure.

To construct an X-ray intensifying screen, powdered phosphor composition is adhered in a thin layer to a flexible support with a polymeric binder. Suitable phosphor supports include cardboard, sized or coated, for example, with baryta, cellulose, acetate propionate, cellulose acetate, cellulose propionate, cellulose acetate butyrate, poly(vinyl chloride or vinyl acetate), polyamide, metal sheeting, for example, aluminum, and poly(ethylene terephthalate), the latter being a preferred support. For use in an X-ray intensifying screen, a support must be permeable to X-rays. Support thickness can vary from about 0.00064 cm (0.00025 inch) to about 0.76 cm (0.30 inch), and films having a thickness up to about 0.02 inch (0.05 cm) are particularly preferred.

Choosing a proper screen thickness typically involves balancing such variables as resolution and image noise. Thin screens display high resolution, but impart high image noise, due in part to reduced absorption of incident X-rays.

To coat a selected support with powdered phosphor, phosphor and binder are mixed to form a composite, which can contain from about 85% to about 96% phosphor, by weight. A layer of phosphor/binder composite is typically applied to the support at a wet thickness of about 0.0127 cm (0.005 inch) to about 0.127 cm (0.050 inch). The phosphor-binder composition can be prepared, using common dispersion techniques, with any conventional binder known in the art. This can be accomplished by ball-milling the phosphor, binder, solvent and other adjuvants for an appropriate period of time. Suitable procedures and useful binding agents are described in U.S. Pat. Nos. 2,648,013, 2,819,183, 2,907,882, 3,043,710 and 3,895,157.

Optionally, the resulting phosphor layer can be overcoated with a thin, transparent protective layer to permit cleaning. Useful protective layers are also described in the aforementioned United States patents. The flexible support beneath the phosphor can optionally be coated with a light-reflective layer, such as a white pigment, to further intensify the light output of the screen. Suitable reflective layers are disclosed in U.S. Pat. Nos. 3,043,710 and 3,895,157.

In use, phosphor-coated sheets are pressed against both sides of a photographic film with emulsion on each side. This assembly is held in a film cassette for X-ray exposure.

LaOCl phosphors exhibit undesirable delayed fluorescence, known in the art as "afterglow", "phosphorescence" or "lag". Delayed fluorescence becomes a problem only when a phosphor screen is used in rapid succession for a series of films. Afterglow persisting longer than the time required for a film change will impose a prior image, or "ghost", on succeeding films. When 0.001 to 0.005 moles of ytterbium per mole of lanthanum bismuth oxyhalide are incorporated into the phosphor, the resulting phosphor exhibits no measurable lag.

The process of the present invention can be further understood by reference to the following examples. In the examples, all percentages are by weight, and all temperatures are in degrees Celsius.

TEST METHODS

Phosphors prepared by the process of the invention were incorporated into test screens and evaluated in accordance with the following test procedure.

3.8 g of sieved phosphor, 1.00 ml of butyl acetate, and 2.54 g of polyvinyl butyral binder were introduced into a 15 ml vial containing eight 4 mm diameter glass beads, as described in U.S. Pat. No. 3,043,710. The resulting mixture was shaken on an oscillatory-type shaker for 15 minutes, and immediately coated onto a pigment board, using a mechanical coater and a 10 mil (250 μm) drawdown knife. The resulting coating was air-dried for about 15 minutes, providing a dry coating of 130±25 μm (5±1 mil) thickness. A 2.5×3.8 cm (1 in×1.5 in) sample was cut from the coated board and mounted on a pigment board with other samples and standards for exposure testing.

These screen samples were evaluated by exposure to X-rays at 80 kVp, substantially according to the following procedure. A pigment board with screen samples attached was inserted into an 8×10 in (20.3×25.4 cm) cassette containing a sheet of high-speed medical X-ray film (Du Pont Cronex ® 4). X-ray exposures of 1.0 mAs at 80 kVp were made at a distance of 63.5 cm (25 in), from a tungsten source filtered by 6.35 mm (0.25 in) thick aluminum. After exposure, films were processed in an automatic rapid processor at 33°, containing standard p-N-methylamine hydrosulfate/hydroquinone developer, for a total processing time of 90 seconds (develop, fix and dry). Optical densities of exposed and developed films were determined using a MacBeth digital densitometer, recorded as "speed", and are herein reported relative to a density recorded for a substantially identical exposure made with a commercial Cronex ® Hi-Plus intensifying screen incorporating CaWO$_4$.

Phosphor samples, prepared as above, were also exposed to 30 kVp Mo X-radiation. The intensity of light emitted by each phosphor sample was detected and recorded with an EMI-Genom 9635Q photomultiplier with peak sensitivity at 366 nm. Samples of equal area were cut from commercial Du Pont Cronex ® Hi-Plus CaWO₄ X-ray intensifying screens, similarly exposed, and the resulting light output recorded. Each sample tested was of approximately equal thickness, typically ranging from about 180 to about 250 m (7-10 mils). The relative intensity of emission of the test screens, reported below as "speed," was recorded as the ratio of the intensity of emission of the test screen to the intensity of emission of the commercial Du Pont Cronex ® Hi-Plus CaWO₄ samples.

Delayed fluorescence, or "lag" determinations were made by exposing screen samples to 400 mAs (80 kVp) X-rays from a tungsten source without an aluminum filter. 15 seconds after exposure, the irradiated screen sample was contacted with an unexposed sheet of X-ray film for 10 minutes. This film was developed and optical densities determined as previously described. The optical density recorded represents lag. Background was determined by exposing a sample of the same film employed to determine lag to the lag exposure in the absence of any test screen. The difference between lag and background optical densities represents net lag. Phosphor samples incorporating from 0.001 to 0.005 moles ytterbium per mole of lanthanum bismuth oxychloride exhibited no measurable net lag.

EXAMPLE 1

$La_{0.988}Bi_{0.010}Yb_{0.002}OCl$ phosphor was prepared by mixing 1400 g $La_2O_3$, 20.3 g $Bi_2O_3$, and 3.36 g $Yb_2O_3$ with 710 g $NH_4Cl$ and 570 g $BaCl_2$. This mixture was shaken for 30 minutes in a 1 gallon polyethylene container on a paint shaker, and divided among three covered 750 ml cylindrical $Al_2O_3$ crucibles. Each crucible and its contents was fired for 2 hours at 300°, then for 4 hours at 500°, and finally maintained at 950° for about 8 hours.

After cooling, each crucible contained a well sintered cake which was readily removed without cutting the crucible. The sintered cake was leached with water until it was free of $BaCl_2$. The resulting phosphor was filtered, washed with water and methanol, and dried at 120°. 0.1% finely divided silica powder was added and the resulting mixture shaken in a polyethylene container for 15 minutes. This mixture was then passed through a No. 325 mesh sieve. Approximately 2 to 5% of the phosphor mixture remained on the No. 325 mesh sieve and was discarded.

The phosphor was analyzed by X-ray diffraction techniques and determined to be single phase $La_{0.998}Bi_{0.010}Yb_{0.002}OCl$.

The phosphor of Example 1 was incorporated into an X-ray intensifying screen at 760 μm (30 mils) wet thickness, and compared to commercially available screens. When measured at 30 kVp, the X-ray excited speed of the test screen was 1.56 times that of a commercial Du Pont Cronex ® Hi-Plus intensifying screen incorporating CaWO₄. At 80 kVp, the speed of the test screen was 2.53 times that of the Du Pont Cronex ® Hi-Plus CaWO₄ intensifying screen.

EXAMPLES 2-10

Phosphors incorporating different amounts of bismuth were prepared and tested by methods substantially similar to those described for Example 1, above. Amounts of starting ingredients, composition of phosphor, and X-ray excited speeds relative to a Du Pont Cronex ® Hi-Plus CaWO₄ screen at 30 kVp are set forth in Table 1 below. Each phosphor was checked by X-ray diffraction and found to be single phase. The emission spectrum of the tested phosphors exhibited essentially a single peak at 368 nm. Higher Bi concentrations resulted in emission spectra in which a lower energy peak at 440 nm was observed to increase relative to the 368 nm peak.

TABLE 1

Relative Speed of Lanthanum Bismuth Oxychloride Phosphors Incorporating Different Amounts of Bismuth

| Ex. No. | Composition | $La_2O_3$ g | $Bi_2O_3$ g | $NH_4Cl$ g | $BaCl_2$ g | X-ray Speed |
|---|---|---|---|---|---|---|
| 2 | $La_{0.97}Bi_{0.03}OCl$ | 100.00 | 4.42 | 50.0 | 50.0 | 1.66 |
| 3 | $La_{0.94}Bi_{0.06}OCl$ | " | 9.13 | " | " | 1.64 |
| 4 | $La_{0.93}Bi_{0.07}OCl$ | " | 10.76 | " | " | 1.66 |
| 5 | $La_{0.92}Bi_{0.08}OCl$ | " | 12.44 | " | " | 1.64 |
| 6 | $La_{0.91}Bi_{0.09}OCl$ | " | 14.14 | " | " | 1.68 |
| 7 | $La_{0.90}Bi_{0.10}OCl$ | " | 15.89 | " | " | 1.65 |
| 8 | $La_{0.88}Bi_{0.12}OCl$ | " | 19.50 | " | " | 1.69 |
| 9 | $La_{0.78}Bi_{0.22}OCl$ | " | 40.34 | " | " | 1.67 |
| 10 | $La_{0.75}Bi_{0.25}OCl$ | " | 47.67 | " | " | 1.34 |

EXAMPLES 11-13, COMPARISONS A AND B

X-ray intensifying screens incorporating lanthanum bismuth oxychloride phosphors prepared according to the process of the invention were evaluated by comparison with a commercial CaWO₄ and a BaFCl:Eu X-ray screen. The lanthanum bismuth oxychloride screens of the invention were prepared according to the following procedure.

First, a reflective backing suspension was prepared by milling the following materials in a ball mill for about 20 hours:

| | |
|---|---|
| Titanium dioxide | 100 g |
| Chlorosulfonated polyethylene | 40 g |
| n-Butyl acetate | 105 g |
| Mixed petroleum naptha (initial boiling pt. = 119°; API grade 59-61 at 15.5°; sp. gravity = 0.7385.) | 105 g |
| Sodium sulfosuccinic acid dioctyl ester | 2 g |

The resulting milled suspension was filtered, applied to a 0.025 cm (0.010 in) thick sheet of biaxially oriented polyethylene terephthalate film to a wet thickness of about 0.025 cm (0.010 in), and dried. This coating procedure was repeated several times to yield a number of reflective layers.

Second, a phosphor suspension was prepared by milling the following ingredients in a ball mill for about 16 hours:

| | |
|---|---|
| Lanthanum bismuth ytterbium oxychloride phosphor ($La_{0.988}Bi_{0.010}Yb_{0.002}OCl$) | 2200 g |
| Polyvinyl butyral binder | 1571 g |

Polyvinyl butyral binder was prepared by mixing the following ingredients (weight percent):

| | |
|---|---|
| n-Butylacetate | 40.4 |
| n-Propanol | 40.4 |
| Polymeric organic silicone (2% in toluene) | 2.0 |
| Potassium salt of monoethyl-phenyl-phenylmonosulfonic acid | 0.6 |
| Glycerol monolaurate | 3.3 |
| Polyvinyl butyral (granular, intrinsic viscosity = 0.81) | 13.3 |

The resulting phosphor suspension was filtered and coated at thicknesses ranging from 0.036 cm (0.014 in) to 0.076 cm (0.030 in) over the reflective layers previously described. After drying, each sample was overcoated with a protective layer of a cellulose acetate/urea formaldehyde solution to a wet thickness of about 0.025 cm (0.010 in), and dried for about 18 hours at about 70°.

Screens prepared by the foregoing procedure were paired, as front and back screens, and a "sandwich" prepared with each screen pair and a sample of conventional X-ray film. Each "sandwich" was exposed to an X-ray source at 80 kVp, 2 mAs through a 2 mm aluminum filter. A step-wedge and resolving power target were placed between the X-ray source and film "sandwich". After exposure, each film sample was developed, fixed and washed according to conventional techniques, and the speed and resolution determined for each sample. The results of these tests are set forth in Table 2, below.

TABLE 2

Comparison of LaBiOCl, CaWO$_4$ and BaFCl:Eu X-ray Intensifying Screens

| Example | Coating Weight (g/6.45 cm$^2$) | | Relative Speed | Resolution (lines/min) |
|---|---|---|---|---|
| | Front Screen | Back Screen | | |
| 11 | 0.145 | 0.324 | 2.08 | 6.0 |
| 12 | 0.192 | 0.271 | 2.08 | 5.8 |
| 13 | 0.225 | 0.275 | 2.00 | 5.7 |
| Comparison A | — | — | 1.00 | 5.6 |
| Comparison B | 0.205 | 0.310 | 2.00 | 5.0 |

The sample marked Comparison A, in Table 2, above, was a commercial Du Pont Cronex ® Hi-Plus X-ray intensifying screen incorporating CaWO$_4$ phosphor. The sample marked Comparison B was prepared with a blue-emitting europium-activated barium fluorochloride phosphor of the type disclosed by Ferretti, U.S. Pat. No. 3,988,252. The results of the comparison tests indicate that screens prepared in accordance with the present invention exhibit speeds approximately twice that of standard CaWO$_4$ screens, and speeds comparable to BaFCl:Eu screens, but with superior resolving power.

BEST MODE

The best mode contemplated by the inventor for the practice of his invention is set forth in Example 1.

I claim:

1. A process for preparing a lanthanum bismuth oxychloride phosphor of the formula $La_{1-x-y}Bi_xRE_yOCl$, where RE is one or more of the rare earth elements, x is 0.001 to about 0.25, and y is 0 to 0.005, said process comprising
   (a) mixing intimately stoichiometric quantities of $La_2O_3$, $Bi_2O_3$, and a rare earth oxide of formula $RE_2O_3$, together with $NH_4Cl$ and a flux comprising $BaCl_2$, where quantities of $NH_4Cl$ and $BaCl_2$, by weight, are each from about one-third to about one-half that of the combined weights of $La_2O_3$, $Bi_2O_3$, and $RE_2O_3$;
   (b) firing said mixture according to a time/temperature sequence in which the mixture is heated in an inert container and in air
      (1) from 1 to about 4 hours at about 275° C. to 325° C. to form lanthanum bismuth oxychloride,
      (2) from about 2 to about 4 hours at about 275° C. to 500° C. to volatilize the remaining $NH_4Cl$, and
      (3) from about 8 to 10 hours at about 800° C. to 1000° C., and
   (c) recovering said phosphor from said mixture by washing the mixture with water.

2. The process of claim 1 wherein the mixture in step (b)(3) is heated for about 8 hours at about 950° C.

3. The process of claim 1 wherein RE is Yb, and x is from 0.005 to 0.015.

4. The process of claim 1, further comprising an additional step of drying said phosphor and mixing therewith between about 0.05 and about 0.10 weight percent of a finely-divided silica powder.

* * * * *